(12) United States Patent
Nishimura et al.

(10) Patent No.: US 12,270,096 B2
(45) Date of Patent: *Apr. 8, 2025

(54) FERRITIC STAINLESS STEEL SHEET, PRODUCTION METHOD THEREOF, AND FERRITIC STAINLESS MEMBER

(71) Applicant: NIPPON STEEL STAINLESS STEEL CORPORATION, Tokyo (JP)

(72) Inventors: Kou Nishimura, Tokyo (JP); Yoshiharu Inoue, Tokyo (JP)

(73) Assignee: NIPPON STEEL STAINLESS STEEL CORPORATION, Tokyo (JP)

( * ) Notice: Subject to any disclaimer, the term of this patent is extended or adjusted under 35 U.S.C. 154(b) by 406 days.

This patent is subject to a terminal disclaimer.

(21) Appl. No.: 17/641,186

(22) PCT Filed: Sep. 25, 2020

(86) PCT No.: PCT/JP2020/036379
§ 371 (c)(1),
(2) Date: Mar. 8, 2022

(87) PCT Pub. No.: WO2021/065738
PCT Pub. Date: Apr. 8, 2021

(65) Prior Publication Data
US 2022/0341014 A1     Oct. 27, 2022

(30) Foreign Application Priority Data
Oct. 2, 2019   (JP) .................................. 2019-182231

(51) Int. Cl.
*C22C 38/60* (2006.01)
*C21D 8/02* (2006.01)
(Continued)

(52) U.S. Cl.
CPC ............ *C22C 38/60* (2013.01); *C21D 8/0226* (2013.01); *C21D 8/0236* (2013.01);
(Continued)

(58) Field of Classification Search
None
See application file for complete search history.

(56) References Cited

U.S. PATENT DOCUMENTS 11,643,699 B2 * 5/2023 Nishimura ............... C23G 1/00
148/609
2002/0036661 A1  9/2002 Yazawa et al.
(Continued)

FOREIGN PATENT DOCUMENTS

CN   106795608   5/2017
JP   06-179921   6/1994
(Continued)

*Primary Examiner* — Anthony M Liang
(74) *Attorney, Agent, or Firm* — Birch, Stewart, Kolasch & Birch, LLP (57) ABSTRACT

A ferritic stainless steel sheet is provided that has a predetermined chemical composition, wherein: a grain size number is 6.0 or more; the ferritic stainless steel sheet satisfies the formulas [A+B≥9.0] and [X+Y≥9.0] with respect to crystal orientation intensities of a ferrite phase obtained by X-ray diffraction; and the sheet thickness is 1.0 mm or more. A represents a {111}<112> crystal orientation intensity at a center portion of sheet thickness, B represents a {111}<112> crystal orientation intensity at a ⅛ portion of the sheet thickness, X represents a {322}<236> crystal orientation intensity at a center portion of sheet thickness, and Y represents a {322}<236> crystal orientation intensity at a ⅛ portion of the sheet thickness.

14 Claims, 2 Drawing Sheets

(51) Int. Cl.
    *C22C 38/00*           (2006.01)
    *C22C 38/06*           (2006.01)
    *C22C 38/10*           (2006.01)
    *C22C 38/12*           (2006.01)
    *C22C 38/14*           (2006.01)
    *C22C 38/16*           (2006.01)

(52) U.S. Cl.
    CPC .......... *C22C 38/002* (2013.01); *C22C 38/005* (2013.01); *C22C 38/008* (2013.01); *C22C 38/06* (2013.01); *C22C 38/105* (2013.01); *C22C 38/12* (2013.01); *C22C 38/14* (2013.01); *C22C 38/16* (2013.01); *C21D 2211/005* (2013.01)

(56) References Cited

U.S. PATENT DOCUMENTS

| | | |
|---|---|---|
| 2002/0136661 A1 | 9/2002 | Yazawa et al. |
| 2013/0149187 A1 | 6/2013 | Inoue et al. |
| 2017/0314093 A1 | 11/2017 | Hamada et al. |
| 2021/0032718 A1 | 2/2021 | Nishimura et al. |

FOREIGN PATENT DOCUMENTS

| | | |
|---|---|---|
| JP | 2000-265215 | 9/2000 |
| JP | 2002-285300 | 10/2002 |
| JP | 2003-138349 | 5/2003 |
| JP | 2005-105347 | 4/2005 |
| JP | 2006-193771 | 7/2006 |
| JP | 2019-002053 | 1/2019 |
| WO | 2019/189872 | 10/2019 |

\* cited by examiner

FERRITIC STAINLESS STEEL SHEET, PRODUCTION METHOD THEREOF, AND FERRITIC STAINLESS MEMBER

TECHNICAL FIELD

The present invention relates to a ferritic stainless steel sheet, a method for producing the ferritic stainless steel sheet, and a ferritic stainless member.

BACKGROUND ART

Ferritic stainless steel sheets are used in a wide range of fields such as household electrical appliances, kitchen instruments, and electronic devices. In recent years, the application of stainless steel sheets as raw material to be used for exhaust pipes, fuel tanks and pipes of automobiles and motorcycles is being studied.

The exhaust system parts are required to have corrosion resistance and heat resistance in the exhaust environment and the fuel environment. Further, the parts are manufactured by forming a steel sheet to press working, or making a steel sheet into a pipe of a predetermined size (diameter) and thereafter forming into the desired shape. Therefore, a blank steel sheet to be used for these parts is required to have high workability.

Furthermore, in recent years the parts configurations have become complicated in order to meet environmental regulations and also achieve a reduction in weight, and in accompaniment therewith the shapes of the parts themselves are also becoming complicated. While the above-mentioned material characteristics of corrosion resistance and heat resistance are naturally required for exhaust system members, the cost is also important. Further, various measures for reducing the number of forming and welding processes performed when forming parts are being examined from the viewpoint of reducing the cost of the parts. Integral forming of parts may be mentioned as one example of such approaches. In the conventional technique, a method has been used in which a steel sheet or a pipe is subjected to a forming process, and thereafter the relevant part is joined by welding to another part.

In contrast, Integral forming refers to a method in which a steel sheet or a pipe is integrally formed in a combination of a variety of processes (deep drawing, bulging, bending, expansion or the like) on parts where are conventionally joined by welding. By producing parts by Integral forming, a welding process can be omitted and the cost can be reduced, on the other hand, a stainless steel sheet to be used for the members is required to have even higher workability.

In this connection, a stainless steel sheet for the exhaust system parts is required to have various kinds of workability. For example, in press working, the workability with respect to deep drawability and hole expandability is an important property. Further, in Integral forming described above, workability with respect to bending, bulging, and expandability is also required in some cases.

Among different kinds of stainless steel sheets, ferritic stainless steel sheets are less expensive in comparison to austenitic stainless steel sheets. Therefore, when considered in terms of cost, it can be said that ferritic stainless steel sheets are suitable as steel sheets to be used for the members. However, because ferritic stainless steel sheets are inferior in formability to austenitic stainless steel sheets, in some cases the usages and shapes to which ferritic stainless steel sheets are applicable are limited. For this reason, in the case of using a ferritic stainless steel sheet as the members, the regions where the ferritic stainless steel sheet can be used have been limited.

Due to the foregoing circumstances, various techniques have been devised to solve the problem regarding workability with regard to heat-resistant ferritic stainless steel sheets for use in exhaust system parts.

Patent Document 1 discloses a steel sheet in which workability is improved by controlling conditions such as the annealing temperature and time period after hot rolling, as well as a method for producing the steel sheet. Specifically, patent Document 1 discloses a steel sheet in which the mean r-value is 1.2 or more. The method of producing the steel sheet is a method that controls the crystal orientation of a steel sheet by performing microstructure control of the steel sheet when subjecting a hot-rolled steel sheet to an annealing process. As a result, a steel sheet which has high workability can be obtained.

Patent Document 2 discloses a steel sheet in which workability is improved by omitting annealing of a hot-rolled steel sheet, as well as a method for producing the steel sheet. Specifically, patent Document 2 discloses a steel sheet having a thickness of 0.7 mm for which the mean r-value is approximately 1.3. The method for producing the steel is a method in which the rolling reduction, the coefficient of friction between the rolls and the steel sheet, and the finish rolling mill exit side temperature are controlled during a hot rolling process and finish rolling. In addition, hot-rolled-sheet annealing is omitted. By this means, the number of processes is reduced, and a steel sheet having further improved workability can be obtained in the invention of patent Document 2.

Patent Document 3 discloses a steel sheet in which workability is improved by controlling hot rolling conditions and performing a two-step cold rolling and annealing process, as well as a method for producing the steel sheet. Specifically, patent Document 3 discloses a steel sheet having a thickness of 0.8 mm for which the mean r-value is at maximum approximately 2.3.

Further, the method for producing the steel sheet controls the temperature during rough rolling and finish rolling of the hot rolling as well as the rolling reduction, and combines intermediate cold rolling and intermediate annealing within a range of 650 to 900° C. By this means, the microstructure prior to the finish cold rolling is controlled and a steel sheet having high workability is obtained.

LIST OF RELATED ART DOCUMENTS

Patent Document

Patent Document 1: JP2005-105347
Patent Document 2: JP2000-265215
Patent Document 3: JP2003-138349

SUMMARY

Technical Problem

Among the different kinds of workability, the deep drawability characteristics, for which the Lankford value (hereunder, described as "r-value") serves as an index, are improved by controlling the crystal orientation. To improve the r-value, it is effective to cause recrystallized grain for which the rolling plane and the {111} plane become parallel (hereunder, also referred to as "{111} grain") to develop through the entire thickness of the steel sheet by increasing the rolling reduction during rolling and making the annealing temperature a high temperature.

The sheet thickness of raw material to be used for an exhaust system part such as a muffler is 1.0 mm or more in some cases. In the case of the steel sheet having a thickness of 1.0 mm or more, the rolling reduction inevitably decreases. Therefore, a case is conceivable in which the {111} grains, which are effective for improving deep drawability, will not be adequately formed by only increasing the rolling reduction during rolling, and the texture will not develop.

In the steels of Patent Documents 1 to 3, in a case where a large amount of Nb is added and the sheet thickness is large, cases are conceivable in which the {111} grains will not adequately develop due to an effect of Nb that delays recrystallization.

Furthermore, in the production process described in Patent Document 1 to 3, when hot-rolled-sheet annealing is performed, working strain that is imparted during hot rolling disappears. Therefore, it is considered that the amount of dislocations that serve as the driving force of recrystallization decreases, and the {111} grains do not adequately develop. In addition, the increase in the number of processes significantly reduces productivity.

In addition, a thin steel sheet with a thickness of 1.0 mm or less is assumed as the steel sheet disclosed in Patent Document 2. Further, even when the production method disclosed in Patent Document 2 is used, it is conceivable that the r-value will be insufficient in the case of a steel sheet with a thickness of 1.0 mm or more. Furthermore, with respect to Patent Document 3, in the case of a steel sheet having a thickness of more than 1.0 mm that is assumed in the present application, it is conceivable that even when two-step cold rolling and annealing is performed, the total rolling reduction ratio will be insufficient and the {111} grains will not adequately develop. In addition, the increase in the number of processes significantly reduces productivity.

Further, performing hot-rolled-sheet annealing, intermediate annealing and/or heat treatment to cause the steel sheet microstructure to recrystallize during the course of production promotes randomization of the crystal orientation in some cases, as in Patent Document 1 or 3. When these steel sheets are subjected to cold rolling and annealing, the in-plane anisotropy (Δr) of the steel sheets is increased, which in some cases leads to a defect such as cracks when forming the steel sheet such as when performing deep drawing and hole expansion.

An objective of the present invention is to solve the problems described above, and provide a ferritic stainless steel sheet for an exhaust part which has a sheet thickness of 1.0 mm or more which is excellent in workability, particularly deep drawability, as well as a method for producing the ferritic stainless steel sheet, and to also provide a ferritic stainless member for an exhaust system part.

Solution to Problem

The present invention has been made to solve the problems described above, and the gist of the present invention is a ferritic stainless steel sheet, a method for producing the ferritic stainless steel sheet, and a ferritic stainless member for an exhaust system part that are described hereunder.

(1) A ferritic stainless steel sheet having a chemical composition including, in mass %,
C: 0.001 to 0.020%,
Si: 0.02 to 1.5%,
Mn: 0.02 to 1.5%,
P: 0.01 to 0.05%,
S: 0.0001 to 0.01%,
Cr: 13.0 to 20.0%,
N: 0.001 to 0.030%,
Nb: 0.005% or more and less than 0.10%,
Ti: 0 to 0.30%,
W: 0 to 2.0%,
Sn: 0 to 0.50%,
Mg: 0 to 0.0100%,
B: 0 to 0.005%,
V: 0 to 1.0%,
Mo: 0 to 3.0%,
Al: 0 to 0.5%,
Cu: 0 to 2.0%,
Zr: 0 to 0.30%,
Co: 0 to 0.50%,
Sb: 0 to 0.50%,
REM: 0 to 0.05%,
Ni: 0 to 2.0%,
Ca: 0 to 0.0030%,
Ta: 0 to 0.10%,
Ga: 0 to 0.1%,
balance: Fe and unavoidable impurities,
wherein:
the chemical composition satisfies formula (i) described hereunder,
a grain size number is 6.0 or more,
the ferritic stainless steel sheet satisfies formula (ii) and (iii) described hereunder with respect to crystal orientation intensities of a ferrite phase obtained by X-ray diffraction, and a sheet thickness is 1.0 mm or more;

$$Ti \geq 4(C+N) \qquad (i)$$

$$A+B \geq 9.0 \qquad (ii)$$

$$X+Y \geq 9.0 \qquad (iii)$$

where, each symbol of an element in the above formula (i) represents a content (mass %) of the corresponding element that is contained in the steel, with a value of a symbol being taken as zero if the corresponding element is not contained, and each symbol in the above formulas (ii) and (iii) is defined as follows:

A: {111}<112> crystal orientation intensity at a center portion of the sheet thickness B: a {111}<112> crystal orientation intensity at a ⅛ portion of the sheet thickness X: a {322}<236> crystal orientation intensity at a center portion of the sheet thickness Y: a {322}<236> crystal orientation intensity at a ⅛ portion of the sheet thickness.

(2) The ferritic stainless steel sheet according to (1) above, wherein the chemical composition contains, in mass %, one or more elements selected from:
W: 0.0005 to 2.0%,
Sn: 0.01 to 0.50%,
Mg: 0.0002 to 0.0100%,
B: 0.0002 to 0.005%,
V: 0.05 to 1.0%, and
Mo: 0.2 to 3.0%.

(3) The ferritic stainless steel sheet according to (1) or (2) above, wherein the chemical composition contains, in mass %, one or more elements selected from:
Al: 0.003 to 0.5%,
Cu: 0.1 to 2.0%,
Zr: 0.05 to 0.30%, Co: 0.05 to 0.50%,
Sb: 0.01 to 0.50%, and
REM: 0.001 to 0.05%.

(4) The ferritic stainless steel sheet according to any one of (1) to (3) above, wherein the chemical composition contains, in mass %, one or more elements selected from:
Ni: 0.1 to 2.0%,
Ca: 0.0001 to 0.0030%,
Ta: 0.01 to 0.10%, and
Ga: 0.0002 to 0.1%.

(5) The ferritic stainless steel sheet according to any one of (1) to (4) above, wherein the ferritic steel sheet satisfies the formula (v) and formula (vi) described hereunder when a mean r-value is calculated by formula (iv) described hereunder:

$$r_m = (r_0 + 2r_{45} + r_{90})/4 \tag{iv}$$

$$r_m \geq 1.50 \tag{v}$$

$$r_{45} \geq 1.30 \tag{vi}$$

where, each symbol in the above formulas is defined as follows:
$r_0$: r-value in a rolling direction
$r_{45}$: r-value in 45° direction with respect to the rolling direction
$r_{90}$: r-value in 90° direction with respect to the rolling direction.

(6) The ferritic stainless steel sheet according to any one of (1) to (5) above, wherein the ferritic stainless steel sheet is used for exhaust system parts.

(7) A ferritic stainless steel member for exhaust system parts of an automobile or a motorcycle, including a terrific stainless steel sheet according to any one of (1) to (5) above.

(8) A method for producing a ferritic stainless steel sheet including executing in sequence:

(a) a process of heating a slab having the chemical composition according to any one of (1) to (4) above, and hot-rolling the slab to form a hot-rolled steel sheet under the condition that the finish rolling temperature is 900° C. or lower;

(b) a hot-rolled steel sheet pickling process of pickling the hot-rolled steel sheet without annealing, to obtain a pickled steel sheet;

(c) a cold rolling process of using a rolling mill having a roll diameter of 400 mm or more to subject the pickled steel sheet to cold rolling with a rolling reduction of 60% or more to obtain a cold-rolled steel sheet; and (d) a process of annealing the cold-rolled steel sheet at an annealing temperature Tf (° C.) that satisfies formula (vii) described hereunder;

wherein:

in the process of (d), an average heating rate is:

set to 15° C. is or more in a temperature region from a starting temperature of heating to a starting temperature of recrystallization Ts (° C.) calculated by formula (viii) described hereunder, and set to 10° C./s or less in a temperature region from the starting temperature of recrystallization Ts (° C.) to the annealing temperature Tf (° C.);

$$800 \leq Tf(° C.) \leq 950 \tag{vii}$$

$$700 \leq Ts(° C.) \leq Tf(° C.) - 100 \tag{viii}$$

Advantageous Effects

According to the present invention, a ferritic stainless steel sheet for exhaust parts with a sheet thickness of 1.0 mm or more which is excellent in workability, particularly deep drawability, as well as a ferritic stainless member for exhaust system parts can be provided.

DESCRIPTION OF EMBODIMENTS

To solve the aforementioned problems, in relation to the workability of ferritic stainless steel sheets, the present inventors conducted detailed studies regarding composition, the microstructure during the course of production, and the crystal orientation formation. As a result, the present inventors obtained the findings described in (A) to (C) hereunder.

(A) In a heat-resistant ferritic stainless steel sheet having a sheet thickness of 1.0 mm or more, in order to obtain a target mean r-value, it is necessary to appropriately control the chemical composition of the steel sheet and the production conditions in each of the production processes, and cause texture of a specific orientation to develop.

(B) As a specific orientation, when texture with {111}<112> orientation develops, the r-values ($r_0$, $r_{45}$, $r_{90}$) for respective directions with respect to the rolling direction increase, particularly the values of $r_0$ and $r_{90}$, and a high mean r-value is obtained. Further, in addition to the orientation, when texture with {322}<236> orientation develops, although $r_0$ decreases, the values of $r_{45}$ and $r_{90}$ increase. In particular, developing texture with {322}<236> orientation is effective for improving $r_{45}$ which it is difficult to improve by simply developing {111} texture alone. It is desirable that the development of the texture described above occur over the entire thickness of the sheet.

(C) To develop the texture over the entire thickness of the sheet, the present inventors focused on promoting the accumulation of hot rolling strain. Generally, when ferritic stainless steel is subjected to hot-rolling, recovery and recrystallization occur during hot-rolling passes or between finish rolling and coiling, then hot-rolling strain decreases and disappears. This recovery and recrystallization occur mainly near the surface of the hot-rolled sheet where shear strain is likely to be introduced. As a result, it is difficult for the texture to develop near the surface of the steel sheet. Lowering the temperature of hot rolling can be considered as a method of suppressing recovery and recrystallization. However, the effect of increasing the accumulation of hot rolling strain is not able to be obtained efficiently, simply by lowering the temperature of hot rolling in the producing range where seizure does not occur in the steel sheet.

In response to the above problems, the present inventors obtained the findings that addition of alloying elements which are highly effective in suppressing recrystallization, within the scope of the present invention, such as Nb, suppresses recovery and recrystallization during hot rolling and promotes the accumulation of hot rolling strain. By using these findings, a steel sheet with high workability, particularly deep drawability, that the texture described above develops not only in the central portion of the sheet thickness but also in the ⅛ portion of the sheet thickness, is obtained.

The present invention has been made based on the findings described above. The respective requirements of the present invention are described in detail hereunder.

1. Chemical Composition

The reasons for limiting each element are as follows. Note that, the symbol "%" with respect to a content in the following description means "mass percent".

C: 0.001 to 0.020%

C deteriorates the toughness, corrosion resistance and oxidation resistance. In addition, C that dissolved in the matrix inhibits development of texture with a {111}<112> orientation and texture with a {322}<236> orientation. Therefore, the lower the content of C is the better. The content of C is set to 0.020% or less. However, excessive reduction of C will lead to an increase in the refining cost, and therefore the content of C is set to 0.001% or more. In addition, in consideration of the production cost and corrosion resistance, the content of C is preferably 0.002% or more, and preferably is 0.010% or less. Similarly, the content of C is more preferably 0.003% or more, and more preferably 0.008% or less.

Si: 0.02 to 1.5%

In addition to being a deoxidizing element, Si is also an element that increases oxidation resistance and high temperature strength. Further, by containing Si, the amount of oxygen in the steel decreases and it becomes easy for texture with a {111}<112> orientation and texture with a {322}<236> orientation to develop. Therefore, the content of Si is set to 0.02% or more. On the other hand, if the content of Si is more than 1.5%, the steel sheet noticeably hardens, and bendability at a time of pipe working deteriorates.

Therefore, the content of Si is set to 1.5% or less. Note that, in order to cause the textures to markedly develop, the content of Si is preferably more than 0.30%, and more preferably is 0.80% or more. Further, in consideration of the toughness and pickling properties during steel sheet production, the content of Si is preferably 1.2% or less. More preferably, the content of Si is 1.0% or less.

Mn: 0.02 to 1.5%

Mn forms $MnCr_2O_4$ or MnO at high temperature, and improves scale adhesion. Therefore, the content of Mn is set to 0.02% or more. the content of Mn is preferably 0.10% or more and more preferably is 0.20% or more. However, if the content of Mn is more than 1.5%, the amount of oxides increases and breakaway oxidation is liable to occur. Further, Mn forms a compound with S and thereby inhibits development of texture with a {111}<112> orientation and texture with a {322}<236> orientation. Therefore, the content of Mn is set to 1.5% or less. Further, in consideration of the toughness and pickling properties during steel sheet production, the content of Mn is preferably 1.0% or less and more preferably is 0.8% or less. In addition, in consideration of flat cracks that are attributable to oxides at pipe weld zones, the content of Mn is more preferably 0.3% or less.

P: 0.01 to 0.05%

P is a solid-solution strengthening element, similarly to Si, and therefore, from the viewpoint of material quality and toughness, the lower the content of P is, the better. Further, P that dissolved in the matrix inhibits development of texture with a {111}<112> orientation and texture with a {322}<236> orientation, and therefore the content of P is set to 0.05% or less.

However, excessive reduction of P will lead to an increase in the refining cost. Therefore, the content of P is set to 0.01% or more. In addition, in consideration of the production cost and oxidation resistance, the content of P is preferably 0.015% or more, and preferably is 0.03% or less.

S: 0.0001 to 0.01%

From the viewpoint of material quality, corrosion resistance and oxidation resistance, the lower the content of S is, the better. In particular, if S is excessively contained, S will form compounds with Ti or Mn which will cause the occurrence of cracks that originate from inclusions when performing pipe bending. In addition, the presence of these compounds will inhibit the development of texture with a {111}<112> orientation and texture with a {322}<236> orientation.

Therefore, the content of S is set to 0.01% or less. However, excessive reduction of S will lead to an increase in the refining cost, and therefore the content of S is set to 0.0001% or more. In addition, in consideration of the production cost and corrosion resistance, the content of S is preferably 0.0005% or more, and preferably is 0.005% or less.

Cr: 13.0 to 20.0%

Cr is a necessary element for securing high temperature strength and oxidation resistance which are the most important characteristics required of exhaust parts. Therefore, the content of Cr is set to 13.0% or more. However, if the content of Cr is more than 20.0%, the toughness will decrease and the producibility will deteriorate, and in particular, will give rise to embrittlement cracking at pipe weld zones and inferior bendability.

In addition, an excessive content of dissolved Cr will inhibit the development of texture with a {111}<112> orientation and texture with a {322}<236> orientation. Therefore, the content of Cr is set to 20.0% or less. Further, from the viewpoint of the toughness of a hot-rolled sheet during steel sheet production, the content of Cr is preferably 14.0% or more. In addition, from the viewpoint of the production cost, the content of Cr is preferably 15.0% or more, and preferably 18.0% or less.

N: 0.001 to 0.030%

Similarly to C, N causes the low-temperature toughness, workability and oxidation resistance to deteriorate. In addition, N that dissolved in the matrix inhibits development of texture with a {111}<112> orientation and texture with a {322}<236> orientation, and therefore the lower the content of N is, the better. Hence, the content of N is set to 0.030% or less. On the other hand, excessive reduction of N will lead to an increase in the refining cost. Therefore, the content of N is set to 0.001% or more. In addition, in consideration of the production cost and toughness, the content of N is preferably 0.005% or more, and preferably is 0.020% or less.

Nb: 0.005% or More and Less than 0.10%

Nb has an effect of suppressing recovery and recrystallization and increasing the amount of accumulated hot rolling strain in the hot rolling process. The hot rolling strain contributes to the development of {111} texture strongly together with the cold rolling strain introduced in the cold rolling process. In addition, Nb combines with C, N, and S, and improves corrosion resistance, intergranular corrosion resistance and deep drawability. Further, because the solid-solution strengthening ability and precipitation strengthening ability of Nb in a high temperature region is high, Nb improves high temperature strength and a thermal fatigue property.

Therefore, the content of Nb is set to 0.005% or more. The content of Nb is preferably 0.010% or more, and more preferably 0.015% or more. However, an excessive content of Nb will markedly delay the progress of recrystallization and will inhibit the development of {111} texture. Therefore, the content of Nb is set to less than 0.10%. Further, in consideration of the influence on recrystallization, the content of Nb is preferably 0.08% or less and more preferably 0.05% or less.

Ti: 0 to 0.30%

$$Ti \geq 4(C+N) \quad (i)$$

where, each symbol of an element in the above formula (i) represents a content (mass %) of the corresponding element that is contained in the steel, with a value of a symbol being taken as zero if the corresponding element is not contained.

Similarly to Nb, Ti combines with C, N, and S and has an effect that improves the corrosion resistance, intergranular corrosion resistance and deep drawability. Further, Ti nitrides get the equiaxial crystal ratio to increase by serving as nuclei during casting of a slab, and cause texture with a {111} orientation to develop in the product sheet and promote an increase in the r-value.

In addition, in the hot rolling step, it is desirable to suppress recovery and recrystallization and accumulate hot rolling strain sufficiently. For this purpose, suppressing of the Nb carbonitride formation is desirable. Therefore, it is necessary to contain Ti sufficiently and fix C and N. In order to obtain the effect of fixing C and N, the ferritic stainless steel sheet according to the present invention needs to satisfy the formula (i) described above. However, if the content of Ti is more than 0.30%, dissolved Ti hardens the steel sheet and lowers toughness. Therefore, the content of Ti is set to 0.30% or less. Further, in consideration of the production cost and so on, the content of Ti is preferably 0.05% or more, and preferably is 0.25% or less.

W: 0 to 2.0%

Similarly to Nb, W suppresses recovery and recrystallization in the hot rolling process and increases the accumulation of hot rolling strain. Furthermore, W has an effect of increasing high temperature strength. Therefore, W may be contained as necessary. However, an excessive content of W deteriorates toughness and elongation. In addition, an excessive content of W increases the formed amount of Laves phase that is an intermetallic compound phase, and inhibits the development of texture with a {111} orientation and decreases the r-value. Therefore, Therefore, the content of W is set to 2.0% or less. Further, in consideration of production cost and producibility, the content of W is preferably 1.5% or less.

On the other hand, since the aforementioned effect is exhibited when the content of W is 0.0005% or more. The content of W is preferably 0.0005% or more. The content of W is more preferably 0.1% or more.

Sn: 0 to 0.50%

Sn causes compositional supercooling to occur during slab casting, and causes the equiaxial crystal ratio to increase. By this means, texture with a {111} orientation is caused to develop in a product sheet, and improvement of the r-value and pipe expandability is promoted. However, if the content of Sn is more than 0.50%, excessive segregation will occur, and the low-temperature toughness of pipe weld zones will decrease. Therefore, the content of Sn is set to 0.50% or less. Further, taking into consideration the high-temperature characteristics, the production cost, and toughness, the content of Sn is preferably 0.30% or less. On the other hand, to obtain the aforementioned effects, the content of Sn is preferably 0.01% or more.

Mg: 0 to 0.0100%

Similarly to Al, Mg forms Mg oxides in molten steel and has an effect as a deoxidizer. In addition, Mg oxides in which Mg finely crystallized act as nuclei and cause the equiaxial crystal ratio of the slab to increase, and stimulate precipitation of Nb- and Ti-based fine precipitates in a subsequent process. Specifically, when the precipitates finely precipitate in a hot rolling process, the precipitates serve as recrystallization nuclei in the hot rolling process and a subsequent annealing process of the hot-rolled sheet. As a result, an extremely fine recrystallized microstructure is obtained. The recrystallized microstructure contributes to development of texture with a {111} orientation, and also contributes to improving the toughness. Therefore, Mg may be contained as necessary.

However, an excessive content of Mg will cause decrease in the oxidation resistance and in weldability. Therefore, the content of Mg is set to 0.0100% or less. On the other hand, to obtain the aforementioned effects, the content of Mg is preferably 0.0002% or more. In addition, in consideration of the refining cost, the content of Mg is more preferably 0.0003% or more, and preferably is 0.0020% or less.

B: 0 to 0.005%

B segregates at grain boundaries and thus has the effect of improving grain boundary strength, secondary workability, low-temperature toughness, and high temperature strength in a medium temperature region. Therefore, B may be contained as necessary. However, if the content of B is more than 0.005%, B compounds such as $Cr_2B$ will be formed, which cause intergranular corrosion properties and fatigue properties to decrease. In addition, B inhibits the development of texture with a {111} orientation, and causes the r-value to decrease. Therefore, the content of B is set to 0.005% or less. On the other hand, to obtain the aforementioned effect, the content of B is preferably 0.0002% or more. In addition, in consideration of weldability and producibility, the content of B is preferably 0.0003% or more, and preferably is 0.0010% or less.

V: 0 to 1.0%

V has an effect of combining with C or N and improving corrosion resistance and heat resistance. Therefore, V may be contained as necessary. However, if the content of V is more than 1.0%, coarse carbo-nitrides will be formed and the toughness will decrease. Furthermore, development of texture with a {111} orientation will also be inhibited. Therefore, the content of V is set to 1.0% or less. In addition, in consideration of the production cost and producibility, the content of V is preferably 0.2% or less. On the other hand, to obtain the aforementioned effect, the content of V is preferably 0.05% or more.

Mo: 0 to 3.0%

Similarly to Nb and W, Mo suppresses recovery and recrystallization in the hot rolling process and increases the accumulation of hot rolling strain. Mo is an element that improves corrosion resistance, and in particular, in the case of a tube blank having a crevice structure, is an element that suppresses crevice corrosion. In addition, Mo has a high effect of improving high temperature strength. Therefore, Mo may be contained as necessary.

However, an excessive content of Mo decreases toughness and elongation. In addition, the formed amount of Laves phase that is an intermetallic compound phase is increased, and inhibits the development of texture with a (1111 orientation, consequently decreases the r-value. Therefore, the content of Mo is set to 3.0% or less. In addition, in consideration of the production cost and producibility, the content of Mo is preferably 1.5% or less. On the other hand, since the aforementioned effect is exhibited when the content of Mo is 0.2% or more. Therefore, the content of Mo is preferably 0.2% or more.

Al: 0 to 0.5%

Al is used as a deoxidizing element in some cases, and also improves high temperature strength and oxidation resistance. Therefore, Al may be contained as necessary. Further, Al acts as a precipitation site of TiN and Laves phase, and refines precipitates and improves low-temperature toughness. However, if the content of Al is more than 0.5%, Al will cause a decrease in elongation, weldability and surface quality. It will also cause formation of coarse Al oxides and reduce the low-temperature toughness. Therefore, the content of Al is set to 0.5% or less. On the other hand, to obtain the aforementioned effects, the content of Al is preferably 0.003% or more. In addition, in consideration of the refining costs, the content of Al is preferably 0.01% or more, and preferably is 0.1% or less.

Cu: 0 to 2.0%

Cu improves corrosion resistance, and also has an effect that improves high temperature strength in a medium temperature region by precipitation of so-called ε-Cu that is precipitation of Cu dissolved in the matrix. Therefore, Cu may be contained as necessary. However, if the content of Cu is excessive, it will cause a decrease in toughness and a reduction in ductility due to hardening of the steel sheet. Therefore, the content of Cu is set to 2.0% or less. In addition, in consideration of oxidation resistance and producibility, the content of Cu is preferably less than 1.5%. On the other hand, to obtain the aforementioned effects, the content of Cu is preferably 0.1% or more.

Zr: 0 to 0.30%

Zr is an element that improves oxidation resistance, and may be contained as necessary. However, if the content of Zr is more than 0.30%, Zr will cause a marked deterioration in producibility such as pickling properties and toughness. Further, it will cause coarsening of compounds of Zr with carbon and nitrogen. As a result, grain coarsening of the steel sheet microstructure will be caused during annealing after hot-rolling and, causing the r-value to decrease. Therefore, the content of Zr is set to 0.30% or less. In addition, in consideration of the production cost, the content of Zr is preferably 0.20% or less. On the other hand, to obtain the aforementioned effect, the content of Zr is preferably 0.05% or more.

Co: 0 to 0.50%

Co is an element that improves high temperature strength, and may be contained as necessary. However, if the content of Co is excessive, Co will cause the toughness and workability to decrease. Therefore, the content of Co is set to 0.50% or less. In addition, in consideration of the production cost, the content of Co is preferably 0.30% or less. On the other hand, to obtain the aforementioned effect, the content of Co is preferably 0.05% or more.

Sb: 0 to 0.50%

Sb segregates at grain boundaries and increases the high temperature strength, and therefore may be contained as necessary. However, if the content of Sb is more than 0.50%, excessive segregation will occur, and the low-temperature toughness of welded zones will be reduced. Therefore, the content of Sb is set to 0.50% or less. In addition, in consideration of high-temperature characteristics, production cost and toughness, the content of Sb is preferably 0.30% or less. On the other hand, to obtain the aforementioned effect, the content of Sb is preferably 0.01% or more.

REM: 0 to 0.05%

REM (rare earth metal) has an effect that refines various kinds of precipitates and improves toughness and oxidation resistance. Therefore, REM may be contained as necessary. However, if the content of REM is more than 0.05%, castability will markedly decrease. Therefore, the content of REM is set to 0.05% or less. On the other hand, to obtain the aforementioned effect, the content of REM is preferably 0.001% or more. Note that, in consideration of the refining cost and producibility, the content of REM is more preferably 0.003% or more, and preferably is 0.01% or less.

In this regard, the term "REM" is a collective term for 17 elements that include the 15 lanthanoid elements and Y and Sc. One or more of these 17 elements may be contained in the steel material, and the term "content of REM" means the sum of the contents of such elements.

Ni: 0 to 2.0%

Ni is an element that improves toughness and corrosion resistance, and therefore may be contained as necessary. However, if the content of Ni is more than 2.0%, austenite phase will form and development of texture with a {111} orientation will be inhibited. As a result, the r-value will decrease and pipe bendability will markedly deteriorate. Therefore, the content of Ni is set to 2.0% or less. In addition, in consideration of the production cost, the content of Ni is preferably 0.5% or less. On the other hand, to obtain the aforementioned effect, the content of Ni is preferably 0.1% or more.

Ca: 0 to 0.0030%

Ca is an effective element as a desulfurizing element, and hence may be contained as necessary. However, if the content of Ca is more than 0.0030%, coarse CaS will form and will cause the toughness and corrosion resistance to deteriorate. Therefore, the content of Ca is set to 0.0030% or less. On the other hand, to obtain the aforementioned effect, the content of Ca is preferably 0.0001% or more. Note that, in consideration of the refining cost and producibility, the content of Ca is more preferably 0.0003% or more, and preferably is 0.0020% or less.

Ta: 0 to 0.10%

Ta combines with C and N and contributes to improving toughness, and hence may be contained as necessary. However, if the content of Ta is more than 0.10%, the production cost will increase, and in addition the producibility will markedly decrease. Therefore, the content of Ta is set to 0.10% or less. On the other hand, to obtain the aforementioned effect, the content of Ta is preferably 0.01% or more. Note that, in consideration of the refining cost and producibility, the content of Ta is more preferably 0.02% or more, and preferably is 0.08% or less.

Ga: 0 to 0.1%

Ga improves corrosion resistance and suppresses hydrogen embrittlement, and hence may be contained as necessary. The content of Ga is set to 0.1% or less. On the other hand, to obtain the aforementioned effect, taking into consideration the formation of sulfides and hydrides, the content of Ga is preferably 0.0002% or more. Note that, from the viewpoint of production cost and producibility as well as ductility and toughness, the content of Ga is more preferably 0.0005% or more, and preferably is 0.02% or less.

The balance in the chemical composition of the steel material of the present invention is Fe and unavoidable impurities. Here, the term "unavoidable impurities" refers to parts which, during industrial production of the steel material, are mixed in from a raw material such as ore or scrap or during the production processes due to various causes, and which are allowed within a range that does not adversely affect the present invention.

2. Grain Size Number

The grain size number of the ferritic stainless steel sheet according to the present invention is set as 6.0 or more, and preferably is 6.5 or more. This is because if the grain size number of the steel sheet is less than 6.0, it will be a cause of surface roughness such as orange peel. On the other hand, because it is necessary to cause grains to grow sufficiently in order to cause {111}<112> texture to develop, the grain size number of the steel sheet is preferably 9.0 or less.

With respect to the grain size number, measurement was performed by performing observation by optical microscope in conformance with JIS G 0511.

3. Crystal Orientation Intensity 3-1. Each Crystal Orientation Intensity

The Ferritic Stainless Steel Sheet According to the Present Invention Satisfies formulas (ii) and (iii) described hereunder with respect to crystal orientation intensities of a ferrite phase obtained by X-ray diffraction.

$$A+B \geq 9.0 \qquad \text{(ii)}$$

$$X+Y \geq 9.0 \qquad \text{(iii)}$$

where each symbol in the above formulas (ii) and (iii) is defined as follows:

A: a {111}<112> crystal orientation intensity at a center portion of the sheet thickness B: a {111}<112> crystal orientation intensity at a ⅛ portion of the sheet thickness X: a {322}<236> crystal orientation intensity at a center portion of the sheet thickness Y: a {322}<236> crystal orientation intensity at a ⅛ portion of the sheet thickness.

When texture with a {111}<112> orientation develops, mainly the values of $r_0$ and $r_{90}$ increase, and workability including deep drawability becomes favorable. Therefore, in the steel sheet according to the present invention, it is necessary that the sum of the {111}<112> crystal orientation intensities at a center portion of sheet thickness and a ⅛ portion of the sheet thickness (hereinafter, described simply as "sum of the {111}<112> crystal orientation intensities") satisfies the formula (ii) described above.

If the sum of the {111}<112> crystal orientation intensities is less than 9.0, texture with a {111}<112> orientation will not develop, and deep drawability will not become favorable. The sum of the {111}<112> crystal orientation intensities is set to 9.0. The sum of the {111}<112> crystal orientation intensities is preferably 10.0 or more, and more preferably 11.0 or more.

Similarly, when texture with a {322}<236> orientation develops, mainly the values of $r_{45}$ increase, and workability including deep drawability becomes favorable. Therefore, in the steel sheet according to the present invention, it is necessary that the sum of the {322}<236> crystal orientation intensities at a center portion of sheet thickness and a ⅛ portion of the sheet thickness (hereinafter, described simply as "sum of the {322}<236> crystal orientation intensities") satisfies the formula (iii) described above.

If the sum of the {322}<236> crystal orientation intensities is less than 9.0, texture with a {322}<236> orientation will not develop, and deep drawability will not become favorable. The sum of the {322}<236> crystal orientation intensities is set to 9.0. The sum of the {322}<236> crystal orientation intensities is preferably 10.0 or more, and more preferably 11.0 or more.

Note that, when evaluating the texture in the steel sheet according to the present invention, measurement was also performed with respect to the crystal orientation intensity at a ⅛ portion of the sheet thickness, and not just the crystal orientation intensity at a center portion of sheet thickness that is generally measured. This is because measurement at a ⅛ portion of the sheet thickness is the most suitable for investigating the effect of suppressing recovery and recrystallization caused by Nb addition during the hot rolling process. In addition, shear deformation introduced in cold rolling, which affects formation of recrystallized microstructure during final annealing, is particularly likely to occur near the surface of the sheet thickness. Therefore, measurement at ⅛ portion of the sheet thickness is suitable for investigating the effect described above.

Furthermore, in case of a chemical composition is outside the range of the present application, in the hot rolling process, the hot rolling strain is reduced by remarkably recovering and recrystallizing, from the surface to a ⅛ portion of the sheet thickness, where shear strain is likely to be introduced. As a result, the {111}<112> crystal orientation intensities and {322}<236> crystal orientation intensities are reduced.

Measurement of the texture was performed by obtaining (200), (110) and (211) pole figures of the sheet-thickness central region (exposing the central region by a combination of mechanical polishing and electropolishing) using an X-ray diffractometer (manufactured by Rigaku Corporation) and Mo-Kα, ray, to obtain an ODF (Orientation Distribution Function) using spherical harmonics based on the pole figures. The {111}<112> crystal orientation intensity and the {322}<236> crystal orientation intensity were calculated based on the measurement results. Note that, in the present invention, crystal orientation intensities of the ferrite phase that is the matrix are measured.

3-2. Each r-Value

The r-values of the steel sheet according to the present invention ware measured by the method described below in accordance with HS Z 2254. The r-values for a direction parallel to the rolling direction and a 45° direction and a 90° direction with respect to the rolling direction were measured by using a test specimen and thereafter a mean r-value was calculated.

In this case, the r-value is calculated by the following method. Specifically, HS No. 13B tensile test pieces are taken from a cold-rolled annealed sheet at locations parallel to the rolling direction, and in a 45° direction and a 90° direction with respect to the rolling direction, and after applying strain of 10 to 20% thereto, the respective values are substituted into formula (a) below to calculate r-values. Further, a mean r-value (hereunder, described as "$r_m$") is calculated using formula (iv) below.

$$r = \ln(W_0/W)/\ln(T_0/T) \qquad \text{(a)}$$

where, each symbol in the above formula is defined hereunder.

$W_0$: sheet width before tensile test
W: sheet width after tensile test
$T_0$: sheet thickness before tensile test
T: sheet thickness after tensile test $$r_m = (r_0 + 2r_{45} + r_{90})/4 \qquad \text{(iv)}$$

where, each symbol in the above formula is defined hereunder.

Figure 1:
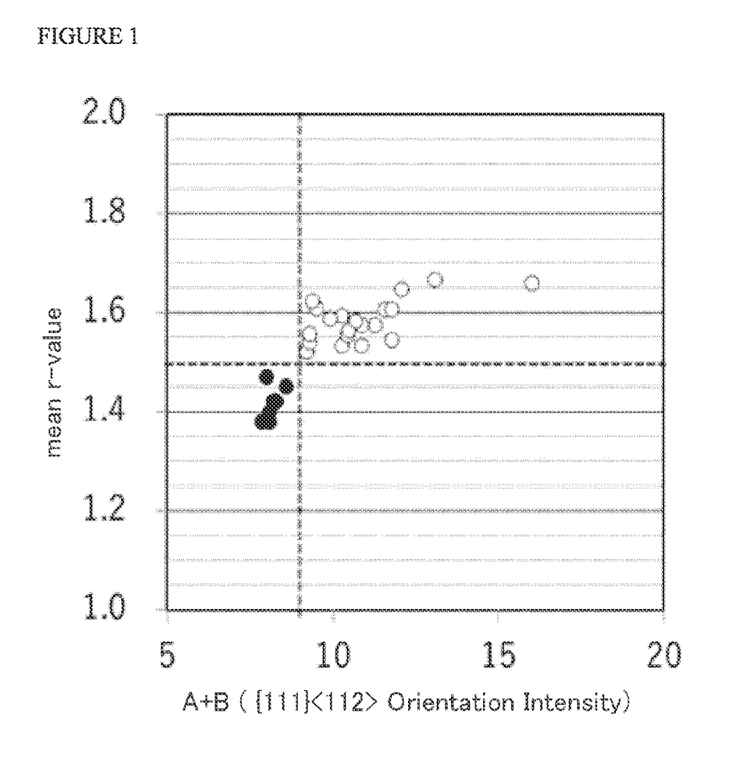
FIG. 1 is a view illustrating a relation between the sum of {111}<112> crystal orientation intensities and the mean r-value, in the steel sheets.
Figure 2:
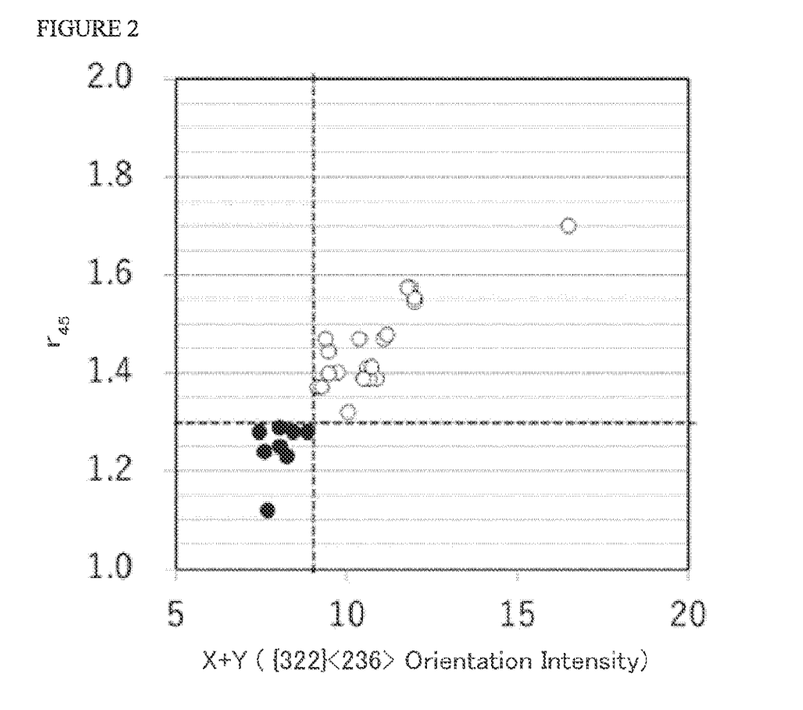
FIG. 2 is a view illustrating a relation between the sum of the {322}<236> crystal orientation intensities and the value of $r_{45}$, in the steel sheets.

$r_0$: r-value in the rolling direction
$r_{45}$: r-value in a 45° direction with respect to the rolling direction
$r_{90}$: r-value in a 90° direction with respect to the rolling direction In FIG. 1, when the sum of the {111}<112> crystal orientation intensities becomes 9.0 or more, the $r_m$ becomes 1.50 or more. Then, when $r_m$ is 1.50 or more, good workability including deep drawability can be obtained. In FIG. 2, when the sum of the {322}<236> crystal orientation intensities becomes 9.0 or more, $r_{45}$ becomes 1.30 or more. Then, when $r_{45}$ is 1.30 or more, good workability including deep drawability can be obtained.

3-3. Relation Between Crystal Orientation Intensity and r-Value

A {111}<112> orientation is a crystal orientation which undergoes slip deformation that strain in the sheet width direction is large in comparison to strain in the thickness direction. Therefore, when the {111}<112> crystal orientation intensity increases, a decrease in sheet thickness is suppressed. As a result, $r_m$ increases. Accordingly, it is necessary for texture with a {111}<112> orientation to develop through the entire thickness of the steel sheet.

Further, when a {322}<236> crystal orientation intensity increases, it changes the anisotropy of the r-value of the steel sheet, and the value of $r_0$ decreases. On the other hand, the value of $r_{45}$ increases instead. As shown in the formula (iv), the contribution of $r_{45}$ to $r_m$ is large, and in order to increase $r_{45}$ that is difficult to increase by simply causing {111}-<112> texture to develop, it is effective to cause texture with a {322}<236> orientation to increase.

In consideration of the circumstances described above, in the steel sheet according to the present invention, the crystal orientation intensities with respect to the {111}<112> orientation and the {322}<236> orientation are made values that satisfy the formulas (ii) and (iii). Then, the crystal orientation intensities with respect to the {111}<112> orientation and the {322}<236> orientation preferably satisfy the formulas not only the formulas (ii) and (iii) but also formulas (v) and (vi).

$$r_m \geq 1.50 \quad \text{(v)}$$

$$r_{45} \geq 1.30 \quad \text{(vi)}$$

4. Sheet Thickness

The sheet thickness of the ferritic stainless steel sheet according to the present invention is set to 1.0 mm or more. The sheet thickness of the ferritic stainless steel sheet is preferably 1.2 mm or more, and more preferably is 1.5 mm or more. On the other hand, when producing a thick steel sheet having a large thickness, it is necessary to make a hot-rolled sheet thick in order to secure adequate rolling reduction. However, it is difficult from an industrial aspect and from the aspect of toughness to make the hot-rolled sheet extremely thick. Therefore, the thickness of the steel sheet is preferably 3.0 mm or less, and more preferably is 2.5 mm or less.

5. Application

The ferritic stainless steel sheet according to the present invention is preferably used for exhaust system parts of automobiles, motorcycles, and the like. The ferritic stainless member for exhaust parts of automobiles or motorcycles may be made by using the ferritic stainless steel sheet according to the present invention as a material.

6. Production Method

Next, the production method will be described. The method for producing the steel sheet of the present invention includes, for example, processes of steelmaking, hot rolling, pickling, cold rolling and annealing. For the steelmaking, a method in which steel having the chemical composition described above is melted in a converter and thereafter subjected to secondary refining is suitable. The thus-melted molten steel is formed into a slab according to a known casting method (continuous casting).

6-1. Hot Rolling Process

Next, the slab is heated to a temperature described hereunder, and is hot-rolled to have a predetermined thickness through a continuous rolling procedure. The cast slab is preferably heated to a temperature in the range of 1100 to 1250° C. This is because, if the heating temperature of the slab is set to less than 1100° C., scale generation will decrease because the heating temperature is too low, and roll scoring will occur between the rolling roll and the steel material, which will cause the surface quality to decrease and will adversely affect the following processes.

On the other hand, setting the heating temperature of the slab to more than 1250° C. is not preferable since sagging of the slab will occur in which the slab will undergo high temperature deformation under its own weight. In addition, taking into consideration productivity and surface defects, the heating temperature of the slab is preferably within the range of 1150 to 1200° C. Note that, in the present invention, the term "heating temperature of the slab" has the same meaning as the term "hot rolling starting temperature".

After heating the slab, in the hot rolling process, a plurality of passes of rough rolling are performed, unidirectional finish rolling is performed using a plurality of stands, and the product is coiled in a coil shape. The hot rolling strain introduced in the hot-rolling process promotes nuclei formation of crystal grains with a {111} crystal orientation which is effective for improving the r-value, together with the cold rolling strain introduced in the subsequent cold rolling process. However, when the finish rolling is performed at a high temperature at this time, recovery and recrystallization occur between the process of hot rolling and coiling process, and as a result hot rolling strain disappears.

Therefore, it is preferable that a hot-rolled steel sheet is formed from the slab under the condition that the finish rolling temperature of hot rolling is 900° C. or lower. The effect of suppressing recovery and recrystallization due to the low temperature of finish rolling during hot rolling is particularly large at the region from the surface to a ⅛ portion of the sheet thickness where shear strain is strongly introduced during hot rolling. This is because the recrystallization generated by the shear strain as a driving force can suppress the disappearance of the hot rolling strain. As a result, the texture at a ⅛ portion of the sheet thickness which is normally difficult to develop develops. Note that, among grains with the {111} orientation, a grain with a {111}<112> orientation may be mentioned as a representative grain.

6-2. Pickling Process of Hot-Rolled Steel Sheet

In the present invention, the hot-rolled steel sheet is subjected to a pickling treatment without performing hot-rolled-sheet annealing, to obtain a pickled steel sheet. This process is different from a typical production method in which a hot-rolled steel sheet is usually subjected to hot-rolled-sheet annealing to obtain a granulated recrystallization microstructure. Typically, although performing hot-rolled-sheet annealing facilitates microstructure control, hot rolling strain disappears and development of the {111}<112> crystal orientation is hindered. In addition, the {322}<236> crystal orientation that improve $r_{45}$ does not develop in an annealing process after the cold rolling.

In this connection, when a steel sheet in which texture referred to as "a-fiber" ({011}//RD({100} to {111}<011>)) developed is annealed, the {322}<236> crystal orientation develops more strongly. In a ferritic stainless steel sheet, the a-fiber develops by hot rolling and cold rolling. However, when hot-rolled-sheet annealing is performed, the a-fiber that developed during hot rolling disappears temporarily before cold rolling, and randomization of the crystal orientation progresses. Therefore, in the present invention, hot-rolled-sheet annealing is not performed.

6-3. Cold Rolling Process

Subsequently, Using a roll with a diameter of 400 mm or more, a pickled steel sheet is cold rolled with a rolling reduction of 60% or more, to obtain a cold-rolled steel sheet. In this case, by adopting a roll diameter of 400 mm or more, introducing of shear strain around the surface can be suppressed during cold rolling. Since shear deformation introduced due to shear strain becomes nucleation sites of randomly oriented grains, it is necessary to suppress shear strain. As a result, in the following annealing process, formation of grains with a {111}<112> crystal orientation that improve the r-value is promoted. By this means, {111}<112> crystal orientation is also caused to develop at a ⅛ portion of the sheet thickness that is a location at which it is usually difficult for a {111}<112> crystal orientation to develop.

Further, when the rolling reduction increases, accumulated energy that serves as a driving force for recrystallization increases. As a result, nuclei of the {111}<112> crystal orientation are likely to be preferentially formed, and it becomes easy for the {111}<112> crystal orientation to be selectively grown. Therefore, the rolling reduction in the cold rolling is preferably 60% or more, and more preferably 70% or more.

6-4. Annealing Process after Cold Rolling

In order to cause a {111}<112> texture to develop and improve the workability, it is preferable to strictly control the annealing temperature and heating rate based on the recrystallization behavior during annealing.

6-4-1. Annealing Temperature

With regard to the final annealing after cold rolling, it is necessary to perform annealing at a sufficiently high temperature for {111}<112> recrystallized grain development. At the same time, annealing at an excessively high temperature leads to coarsening of the grains, and is a cause of surface roughness such as orange peel. Further, it is necessary to make the steel microstructure of the steel sheet according to the present invention a fine microstructure with a grain size number of 6.0 or more. Therefore, the cold-rolled steel is preferably annealed at an annealing temperature $Tf$ (° C.) within the range of formula (vii) described hereunder:

$$700 \leq Ts(° C.) \leq Tf(° C.)-100 \tag{vii}$$

If the annealing temperature $Tf$ (° C.) is less than 800° C., recrystallized grains with a {111}<112> orientation and a {322}<236> orientation cannot develop sufficiently. Therefore, the annealing temperature $Tf$ (° C.) is preferably 800° C. or more. On the other hand, if the annealing temperature $Tf$ (° C.) is more than 950° C., it causes rapid grain growth, and the grain size number may be 6.0. Therefore, the annealing temperature $Tf$ (° C.) is preferably 950° C. or lower.

6-4-2. Heating Rate

For the steel sheet according to the present invention, it is preferable to control the average heating rate for the time period from the starting temperature of heating (temperature that starts to rise) until the target temperature is reached. Among recrystallized grains, grains with a {111}<112> orientation are liable to form at a relatively early stage of recrystallization in comparison to grains with other orientations. Further, grains with a {111}<112> orientation undergo grain growth during annealing and develop by encroaching on grains with other orientations. At such time, before recrystallization of {111} orientation starts, if the temperature rises to a temperature at which grains with other orientations recrystallize, development of texture with a {111}<112> orientation will be suppressed and the workability will decrease. Therefore, it is preferable to cause recrystallization to proceed by first causing the steel sheet temperature to reach the starting temperature of recrystallization Ts (° C.) by rapid heating, and thereafter slowly increasing the temperature until the annealing temperature $Tf$ (° C.) to thereby cause grains with a {111}<112> orientation to grow.

Note that, Ts (° C.) at such time is calculated by the following formula (viii), and Ts (° C.) is more preferably satisfying following formula (xi). By this means, texture with a {111}<112> orientation develops strongly.

$$700 \leq Ts(° C.) \leq Tf(° C.)-100 \tag{vii}$$

$$Ts(° C.)=700+(1-X/100)\times130 \tag{viii}$$

where, the symbol in the above formula is defined below.
X: rolling reduction in cold rolling (%)

For the steel sheet according to the present invention, the average heating rate from the starting temperature of heating to the starting temperature of recrystallization Ts (° C.) is preferably 15° C./s or more, and more preferably is 20° C./s or more. Further, the average heating rate from the starting temperature of recrystallization Ts (° C.) to the annealing temperature $Tf$ (° C.) is preferably 10° C./s or less, and more preferably is 5° C./s or less.

Further, by rolling with a large-diameter roll that has a diameter of 400 mm or more as described above, introduction of shear deformation is suppressed in comparison to a usual production method. As a result, formation of randomly oriented grains due to shear deformation is suppressed. In addition, this is combined with an effect of nucleation of grains with a {111}<112> orientation at an early stage so that {111}<112> orientation strongly develops in comparison to the usual production method (rolling with a small-diameter roll and without heat treatment control).

Furthermore, by adopting the aforementioned production conditions in addition to omitting hot-rolled-sheet annealing as described above, texture with a {322}<236> orientation and texture with a {111}<112> orientation develop simultaneously. Thus, the ferritic stainless steel sheet according to the present invention can be obtained.

6-5. Other Production Conditions

The slab thickness and hot-rolled sheet thickness and the like may be designed as appropriate. Further, the degree of roll roughness, rolling oil, number of rolling passes, rolling speed, rolling temperature and the like in the cold rolling may be designed as appropriate. With respect to annealing, as necessary, bright annealing which is annealing in a non-oxidizing atmosphere such as hydrogen gas or nitrogen gas may be performed. Further, annealing may be performed in the atmospheric air. In addition, after annealing, a tension leveler process for temper rolling or shape straightening may be performed, or the sheet may be passed through.

6-6. Method for Producing Ferritic Stainless Member

The following method is used to make a steel sheet produced by the method described above into members for exhaust parts. These members are press worked from the steel sheet or are formed into a target shape after the steel sheet is made into a pipe of a predetermined size (diameter).

Hereunder, the present invention is described more specifically by way of examples, although the present invention is not limited to these examples.

Example 1

Steels having the chemical compositions shown in Table 1 were melted, cast into slabs, and hot-rolled under conditions of a slab heating temperature of 1150° C., a finish rolling temperature of 880° C., and a coiling temperature of 500° C. to make hot-rolled steel sheets.

TABLE 1

| | | Chemical Composition (mass %, balance is Fe and impurities) | | | | | | | | | | | | | |
|---|---|---|---|---|---|---|---|---|---|---|---|---|---|---|---|
| | Steel | | | | | | | | | | A group | | | | |
| | No. | C | Si | Mn | P | S | Cr | N | Nb | Ti | W | Sn | Mg | B | V |
| Inventive Examples | A1 | 0.002 | 0.72 | 0.48 | 0.03 | 0.004 | 16.9 | 0.011 | 0.010 | 0.213 | — | — | — | — | — |
| | A2 | 0.019 | 0.24 | 0.82 | 0.02 | 0.005 | 16.7 | 0.010 | 0.009 | 0.132 | — | — | — | — | — |
| | A3 | 0.009 | 0.03 | 0.89 | 0.01 | 0.004 | 15.2 | 0.012 | 0.009 | 0.200 | — | — | — | — | — |
| | A4 | 0.008 | 1.44 | 0.27 | 0.03 | 0.005 | 17.2 | 0.008 | 0.012 | 0.101 | — | — | — | — | — |
| | A5 | 0.007 | 0.12 | 0.02 | 0.02 | 0.002 | 18.2 | 0.011 | 0.009 | 0.122 | — | — | — | — | — |
| | A6 | 0.007 | 0.23 | 1.48 | 0.01 | 0.007 | 15.5 | 0.020 | 0.006 | 0.119 | — | — | — | — | — |
| | A7 | 0.009 | 0.95 | 0.59 | 0.04 | 0.006 | 15.4 | 0.013 | 0.030 | 0.139 | — | — | — | — | — |
| | A8 | 0.006 | 0.69 | 0.48 | 0.02 | 0.009 | 15.0 | 0.008 | 0.009 | 0.202 | — | — | — | — | — |
| | A9 | 0.011 | 0.86 | 0.30 | 0.03 | 0.007 | 13.0 | 0.020 | 0.018 | 0.134 | — | — | — | — | — |
| | A10 | 0.009 | 0.85 | 0.97 | 0.02 | 0.004 | 19.8 | 0.013 | 0.014 | 0.243 | — | — | — | — | — |
| | A11 | 0.014 | 0.34 | 0.46 | 0.02 | 0.002 | 14.6 | 0.016 | 0.005 | 0.175 | — | — | — | — | — |
| | A12 | 0.006 | 0.13 | 0.92 | 0.02 | 0.004 | 15.0 | 0.013 | 0.091 | 0.161 | — | — | — | — | — |
| | A13 | 0.007 | 0.17 | 0.84 | 0.01 | 0.002 | 18.4 | 0.011 | 0.030 | 0.083 | — | — | — | — | — |
| | A14 | 0.014 | 0.16 | 0.68 | 0.01 | 0.004 | 15.5 | 0.017 | 0.007 | 0.274 | — | — | — | — | — |
| | A15 | 0.009 | 0.19 | 0.34 | 0.02 | 0.002 | 15.1 | 0.004 | 0.015 | 0.190 | — | — | — | — | — |
| | A16 | 0.005 | 0.36 | 0.96 | 0.03 | 0.002 | 15.8 | 0.028 | 0.010 | 0.141 | — | — | — | — | — |
| | A17 | 0.011 | 0.71 | 0.86 | 0.03 | 0.005 | 18.9 | 0.019 | 0.007 | 0.140 | 1.48 | — | — | — | — |
| | A18 | 0.009 | 0.71 | 0.62 | 0.02 | 0.001 | 18.7 | 0.016 | 0.013 | 0.237 | — | 0.318 | 0.0077 | — | — |
| | A19 | 0.006 | 0.25 | 0.61 | 0.02 | 0.003 | 17.8 | 0.011 | 0.006 | 0.160 | — | — | — | — | — |
| | A20 | 0.006 | 0.79 | 1.00 | 0.01 | 0.003 | 14.4 | 0.008 | 0.006 | 0.101 | — | — | — | 0.0029 | 0.631 |
| Comparative Examples | a1 | 0.028 | 0.49 | 0.55 | 0.02 | 0.002 | 14.8 | 0.018 | 0.011 | 0.188 | — | — | — | — | — |
| | a2 | 0.009 | 0.01 | 0.51 | 0.02 | 0.003 | 18.3 | 0.012 | 0.009 | 0.157 | — | — | — | — | — |
| | a3 | 0.005 | 0.92 | 1.63 | 0.02 | 0.003 | 18.3 | 0.012 | 0.007 | 0.235 | — | — | — | — | — |
| | a4 | 0.012 | 0.64 | 0.38 | 0.07 | 0.002 | 19.0 | 0.017 | 0.020 | 0.117 | — | — | — | — | — |
| | a5 | 0.006 | 0.10 | 0.40 | 0.02 | 0.016 | 16.8 | 0.018 | 0.023 | 0.108 | — | — | — | — | — |
| | a6 | 0.005 | 0.61 | 0.77 | 0.03 | 0.005 | 22.1 | 0.008 | 0.006 | 0.115 | — | — | — | — | — |
| | a7 | 0.006 | 0.86 | 0.77 | 0.03 | 0.003 | 14.6 | 0.014 | 0.001 | 0.226 | — | — | — | — | — |
| | a8 | 0.005 | 0.89 | 0.46 | 0.01 | 0.002 | 14.0 | 0.019 | 0.145 | 0.230 | — | — | — | — | — |
| | a9 | 0.013 | 0.97 | 0.62 | 0.01 | 0.002 | 14.9 | 0.014 | 0.007 | 0.082 | — | — | — | — | — |
| | a10 | 0.009 | 0.47 | 0.36 | 0.02 | 0.002 | 15.9 | 0.036 | 0.015 | 0.218 | — | — | — | — | — |

| | Steel | Chemical Composition (mass %, balance is Fe and impurities) | | | | | | | | | | | Right-hand value of formula (i) |
|---|---|---|---|---|---|---|---|---|---|---|---|---|---|
| | | A group | B group | | | | | | C group | | | | |
| | No. | Mo | Al | Cu | Zr | Ce | Sb | REM | Ni | Ca | Ta | Ga | |
| Inventive Examples | A1 | — | — | — | — | — | — | — | — | — | — | — | 0.050 |
| | A2 | — | — | — | — | — | — | — | — | — | — | — | 0.116 |
| | A3 | — | — | — | — | — | — | — | — | — | — | — | 0.083 |
| | A4 | — | — | — | — | — | — | — | — | — | — | — | 0.065 |
| | A5 | — | — | — | — | — | 0.46 | — | — | — | — | — | 0.072 |
| | A6 | — | — | — | — | — | — | — | 0.41 | — | — | — | 0.106 |
| | A7 | — | — | — | 0.22 | — | — | — | — | — | 0.07 | — | 0.088 |
| | A8 | — | — | — | — | — | — | — | — | — | — | — | 0.056 |
| | A9 | — | — | 0.4 | — | — | — | 0.048 | — | — | — | 0.081 | 0.123 |
| | A10 | — | — | — | — | — | — | — | 0.22 | — | — | — | 0.087 |
| | A11 | — | — | — | — | — | — | — | — | — | — | — | 0.118 |
| | A12 | — | 0.410 | — | — | — | — | — | — | 0.0026 | — | — | 0.077 |
| | A13 | — | — | — | — | — | — | — | — | — | — | — | 0.073 |
| | A14 | — | — | — | — | — | — | — | — | — | — | — | 0.124 |
| | A15 | — | — | — | — | 0.45 | — | — | — | — | — | — | 0.052 |
| | A16 | — | — | — | — | — | — | — | — | — | — | — | 0.132 |
| | A17 | 2.70 | — | 0.7 | — | — | — | — | — | — | — | — | 0.118 |
| | A18 | — | — | — | — | — | — | — | — | — | — | — | 0.100 |
| | A19 | — | 0.101 | — | — | — | — | — | — | — | — | — | 0.066 |
| | A20 | — | — | — | — | — | — | — | — | — | — | — | 0.057 |
| Comparative Examples | a1 | — | — | — | — | — | — | — | — | — | — | — | 0.186 |
| | a2 | — | — | — | 0.25 | — | — | — | — | — | — | — | 0.084 |
| | a3 | — | — | — | — | — | 0.31 | — | — | — | — | — | 0.066 |
| | a4 | — | — | — | — | — | — | — | — | — | — | — | 0.115 |
| | a5 | — | — | — | — | — | — | — | — | — | 0.04 | — | 0.097 |
| | a6 | — | — | — | — | — | — | — | — | — | — | — | 0.052 |
| | a7 | — | — | — | — | — | — | — | — | — | — | — | 0.077 |
| | a8 | — | — | — | — | 0.47 | — | — | — | — | — | — | 0.097 |
| | a9 | — | — | — | — | — | — | — | — | — | — | — | 0.106 |
| | a10 | — | — | — | — | — | — | — | — | — | — | — | 0.180 |

— Indicates value is outside range defined by the present invention.
Ti ≥ 4(C + N) - - - (i)

Thereafter, the respective hot-rolled steel sheets were pickled and cold-rolled to the thickness shown in Table 2 with rolling reductions of 60% or more, using a roll with a diameter within the range of 400 to 500 mm. Then, continuous annealing and pickling were performed to make steel sheets. The annealing conditions, such like the annealing temperature Tf (° C.), the recrystallization start temperature Ts (° C.), as well as the heating rate in a temperature region from a starting temperature of heating to a starting temperature of recrystallization Ts (° C.) and the heating rate from the starting temperature of recrystallization Ts (° C.) to the annealing temperature Tf (° C.), meet the preferred range of the present invention.

tion and a 45° direction and a 90° direction with respect to the rolling direction and determining the r-values, a mean r-value was calculated. Specifically, JIS No. 13B tensile test pieces were taken, and after applying strain of 10 to 20% in a direction parallel to the rolling direction and a 45° direction and a 90° direction with respect to the rolling direction, the values were calculated by a prescribed method. Note that, the workability (deep drawability) was evaluated based on the measured r-value. Specifically, the case that is $r_m \geq 1.50$ and $r_{45} \geq 1.30$ was evaluated as having good workability (deep drawability).

Further, Inventive Examples B1 to B20 of the present invention that used steels (Steel Nos. A1 to A20 in Table 1)

TABLE 2

| | Steel | Sheet Thickness | Grain Size | Crystal Orientation Intensity | | Evaluation of Property | |
|---|---|---|---|---|---|---|---|
| Symbol | No. | (mm) | Number | A + B | X + Y | $r_m$ | $r_{45}$ |
| Inventive Examples | | | | | | | |
| B1 | A1 | 1.0 | 6.8 | 16.0 | 16.5 | 1.66 | 1.70 |
| B2 | A2 | 1.5 | 6.5 | 10.3 | 10.9 | 1.53 | 1.39 |
| B3 | A3 | 1.2 | 7.6 | 11.6 | 11.9 | 1.61 | 1.57 |
| B4 | A4 | 1.6 | 6.7 | 10.5 | 9.5 | 1.56 | 1.44 |
| B5 | A5 | 1.5 | 7.2 | 10.3 | 10.4 | 1.59 | 1.47 |
| B6 | A6 | 1.5 | 7.2 | 10.5 | 10.6 | 1.56 | 1.41 |
| B7 | A7 | 1.5 | 7.5 | 11.3 | 10.7 | 1.57 | 1.39 |
| B8 | A8 | 1.7 | 6.6 | 9.5 | 9.1 | 1.61 | 1.37 |
| B9 | A9 | 1.5 | 7.3 | 9.4 | 11.1 | 1.62 | 1.47 |
| B10 | A10 | 1.2 | 7.2 | 11.8 | 12.0 | 1.61 | 1.54 |
| B11 | A11 | 1.5 | 7.6 | 10.9 | 10.5 | 1.57 | 1.39 |
| B12 | A12 | 2.0 | 6.5 | 9.2 | 10.0 | 1.52 | 1.32 |
| B13 | A13 | 1.8 | 7.7 | 9.3 | 9.3 | 1.54 | 1.37 |
| B14 | A14 | 1.7 | 6.3 | 9.9 | 10.7 | 1.59 | 1.41 |
| B15 | A15 | 1.2 | 6.2 | 12.1 | 12.0 | 1.65 | 1.55 |
| B16 | A16 | 1.7 | 6.2 | 9.3 | 9.7 | 1.56 | 1.40 |
| B17 | A17 | 1.2 | 7.8 | 13.1 | 11.8 | 1.67 | 1.57 |
| B18 | A18 | 1.5 | 7.2 | 11.8 | 9.5 | 1.54 | 1.40 |
| B19 | A19 | 1.5 | 6.5 | 10.9 | 9.4 | 1.53 | 1.47 |
| B20 | A20 | 1.5 | 7.2 | 10.7 | 11.2 | 1.58 | 1.48 |
| Comparative Examples | | | | | | | |
| b1 | a1 | 1.5 | 7.1 | <u>8.1</u> | <u>8.2</u> | 1.38 | 1.23 |
| b2 | <u>a2</u> | 1.5 | 7.2 | <u>9.1</u> | <u>7.4</u> | 1.52 | 1.28 |
| b3 | <u>a3</u> | 1.2 | 7.3 | <u>8.3</u> | <u>9.2</u> | 1.42 | 1.52 |
| b4 | <u>a4</u> | 1.5 | 7.7 | <u>8.6</u> | 8.8 | 1.45 | 1.28 |
| b5 | <u>a5</u> | 1.0 | 7.5 | <u>9.6</u> | <u>7.6</u> | 1.53 | 1.24 |
| b6 | <u>a6</u> | 1.5 | 8.0 | <u>8.2</u> | <u>8.0</u> | 1.42 | 1.29 |
| b7 | <u>a7</u> | 2.0 | 6.6 | <u>7.9</u> | <u>7.7</u> | 1.38 | 1.12 |
| b8 | <u>a8</u> | 1.7 | 7.1 | <u>8.1</u> | <u>8.0</u> | 1.40 | 1.25 |
| b9 | <u>a9</u> | 1.5 | 6.6 | <u>8.0</u> | <u>8.4</u> | 1.47 | 1.28 |

Underline indicates value is outside range defined by the present invention.

The steel sheets obtained in this way ware subjected to the measurements of grain size number, crystal orientation intensity, and r-value. With respect to the grain size number, measurement was performed by performing observation by optical microscope in conformance with JIS G 0511.

With regard to the crystal orientation intensity measurement, (200), (110) and (211) pole figures of the sheet-thickness central region (exposing the central region by a combination of mechanical polishing and electropolishing) were obtained using an X-ray diffractometer (manufactured by Rigaku Corporation) and Mo-Kα ray, and an ODF (Orientation Distribution Function) was obtained using spherical harmonics based on the pole figures. The {111}<011> crystal orientation intensity and the {322}<236> crystal orientation intensity were calculated based on the measurement results. Note that, in the present invention, crystal orientation intensities of the ferrite phase that is the matrix were measured.

With regard to the r-value, after executing the method described above in accordance with JIS Z 2254, and taking test specimens from a direction parallel to the rolling direchaving a chemical composition defined by the present invention satisfied the requirements defined by the present invention such as crystal orientation intensities (textures) of the ferrite phase and grain size numbers. As a result, the steel sheets which are Inventive Examples B1 to B20 were excellent in workability. In contrast, in Comparative Examples b1 to b9 that used steels (Steel Nos. a1 to a9 in Table 1) having a composition outside the range defined by the present invention, the crystal orientation intensities (textures) of the ferrite phase defined by the present invention were low, and because the mean r-value was low, these Comparative Examples b1 to b9 were inferior in workability.

Example 2

The steels listed in Table 1 were hot-rolled, pickled, and in some case, subjected to hot-rolled-sheet annealing, under the conditions shown in Table 3. Then steels were cold-rolled and subjected to cold-rolled-sheet annealing and under the conditions shown in Table 3. Each production condition is as shown in Table 3. Further, the workability (deep drawability) was evaluated by r-value, similarly to Example 1.

TABLE 3

|  |  |  | Hot Rolling | | Cold Rolling | | Cold-Rolled-Sheet Annealing | | |
|---|---|---|---|---|---|---|---|---|---|
|  |  |  | Temperature of Finish Rolling | Annealing Temperature | Roll Diameter | Rolling Reduction | Heating Rate | | |
|  | Symbol | Steel No. | (° C.) | (° C.) | (mm) | (%) | Until Ts (° C./s) | Ts~Tf (° C./s) | Ts (° C.) |
| Inventive Examples | C1 | A19 | 830 | — | 500 | 70 | 18 | 4 | 739 |
|  | C2 | A19 | 780 | — | 500 | 70 | 18 | 4 | 739 |
|  | C3 | A12 | 830 | — | 500 | 60 | 20 | 5 | 752 |
| Comparative Examples | c1 | A19 | <u>910</u> | — | 500 | 70 | 18 | 4 | 739 |
|  | c2 | A19 | 830 | <u>900</u> | 500 | 70 | 18 | 5 | 739 |
|  | c3 | A19 | 830 | — | <u>105</u> | 70 | 18 | 4 | 739 |
|  | c4 | A19 | 830 | — | 500 | <u>50</u> | 18 | 4 | 765 |
|  | c5 | A19 | 830 | — | 500 | 70 | <u>5</u> | 5 | 733 |
|  | c6 | A19 | 830 | — | 500 | 70 | 20 | <u>20</u> | 739 |
|  | c7 | A19 | 830 | — | 500 | 70 | 18 | 4 | <u>739</u> |

|  |  | Cold-Rolled-Sheet | | | Evaluation of Property | | | |
|---|---|---|---|---|---|---|---|---|
|  |  | Annealing Tf | Sheet Thickness | Grain Size | Crystal Orientation Intensity | | r-value | |
|  | Symbol | (° C.) | (mm) | Number | A + B | X + Y | $r_m$ | $r_{45}$ |
| Inventive Examples | C1 | 870 | 1.5 | 6.7 | 11.5 | 9.8 | 1.56 | 1.55 |
|  | C2 | 870 | 1.5 | 7.1 | 12.7 | 11.5 | 1.64 | 1.67 |
|  | C3 | 870 | 2.0 | 6.8 | 10.1 | 11.5 | 1.57 | 1.39 |
| Comparative Examples | c1 | 869 | 1.5 | 6.3 | 8.8 | <u>7.6</u> | 1.48 | 1.13 |
|  | c2 | 870 | 1.5 | 6.0 | <u>7.9</u> | <u>4.8</u> | 1.38 | 1.03 |
|  | c3 | 900 | 1.5 | 6.4 | <u>8.3</u> | 9.1 | 1.44 | 1.25 |
|  | c4 | 870 | 2.5 | 6.1 | <u>7.7</u> | <u>5.3</u> | 1.31 | 0.99 |
|  | c5 | 890 | 1.5 | 6.6 | <u>8.5</u> | <u>7.9</u> | 1.41 | 1.21 |
|  | c6 | 890 | 1.5 | 6.2 | <u>7.7</u> | <u>7.6</u> | 1.35 | 1.23 |
|  | c7 | <u>760</u> | 1.5 | — | 11.3 | <u>8.4</u> | — | — |

Underline indicates value that is outside range defined by the present invention. deviates from preferable production conditions of the present invention.

Inventive Examples C1 to C3 of the present invention were the examples that have a chemical composition within the range of present invention and the production conditions satisfied the preferable conditions in the present invention, and therefore the Examples having favorable workability were obtained. In contrast, in Comparative Examples c1 to c7, the production conditions deviated from the preferable conditions in the present invention. Therefore, the crystal orientation intensities of the steel sheets of Comparative Examples c1 to c7 were outside the defined ranges of the present invention, and the workability (deep drawability) were not good. Note that, the r-value of c7 could not be evaluated because the properties of the c7 steel sheet were poor.

The invention claimed is:

1. A ferritic stainless steel sheet having a chemical composition comprising, in mass %,
C: 0.001 to 0.020%,
Si: 0.02 to 1.5%,
Mn: 0.02 to 1.5%,
P: 0.01 to 0.05%,
S: 0.0001 to 0.01%,
Cr: 13.0 to 20.0%,
N: 0.001 to 0.030%,
Nb: 0.005% or more and less than 0.10%,
Ti: 0 to 0.30%,
W: 0 to 2.0%,
Sn: 0 to 0.50%,
Mg: 0 to 0.0100%,
B: 0 to 0.005%,
V: 0 to 1.0%,
Mo: 0 to 3.0%,
Al: 0 to 0.5%,
Cu: 0 to 2.0%,
Zr: 0 to 0.30%,
Co: 0 to 0.50%,
Sb: 0 to 0.50%,
REM: 0 to 0.05%,
Ni: 0 to 2.0%,
Ca: 0 to 0.0030%,
Ta: 0 to 0.10%,
Ga: 0 to 0.1%,
balance: Fe and unavoidable impurities,
wherein:
the chemical composition satisfies formula (i) described hereunder,
a grain size number is 6.0 or more,
the ferritic stainless steel sheet satisfies formula (ii) and (iii) described hereunder with respect to crystal orientation intensities of a ferrite phase obtained by X-ray diffraction,
and a sheet thickness is 1.0 mm or more;

$$Ti \geq 4(C+N) \quad \text{(i)}$$

$$A+B \geq 9.0 \quad \text{(ii)}$$

$$X+Y \geq 9.0 \quad \text{(iii)}$$

where, each symbol of an element in the above formula (i) represents a content (mass %) of the corresponding element that is contained in the steel, with a value of a symbol being taken as zero if the corresponding element is not contained, and each symbol in the above formulas (ii) and (iii) is defined as follows:

A: a {111}<112> crystal orientation intensity at a center portion of the sheet thickness B: a {111}<112> crystal orientation intensity at a ⅛ portion of the sheet thickness X: a {322}<236> crystal orientation intensity at a center portion of the sheet thickness Y: a {322}<236> crystal orientation intensity at a ⅛ portion of the sheet thickness.

2. The ferritic stainless steel sheet according to claim 1, wherein the chemical composition contains, in mass %, one or more elements selected from:

W: 0.0005 to 2.0%,
Sn: 0.01 to 0.50%,
Mg: 0.0002 to 0.0100%,
B: 0.0002 to 0.005%,
V: 0.05 to 1.0%,
Mo: 0.2 to 3.0%,
Al: 0.003 to 0.5%,
Cu: 0.1 to 2.0%,
Zr: 0.05 to 0.30%,
Co: 0.05 to 0.50%,
Sb: 0.01 to 0.50%,
REM: 0.001 to 0.05%,
Ni: 0.1 to 2.0%,
Ca: 0.0001 to 0.0030%,
Ta: 0.01 to 0.10%, and
Ga: 0.0002 to 0.1%.

3. The ferritic stainless steel sheet according to claim 1, wherein the ferritic steel sheet satisfies the formula (v) and formula (vi) described hereunder when a mean r-value is calculated by formula (iv) described hereunder:

$$r_m = (r_0 + 2r_{45} + r_{90})/4 \quad \text{(iv)}$$

$$r_m \geq 1.50 \quad \text{(v)}$$

$$r_{45} \geq 1.30 \quad \text{(vi)}$$

where, each symbol in the above formulas is defined as follows:

$r_0$: r-value in a rolling direction $r_{45}$: r-value in 45° direction with respect to the rolling direction $r_{90}$: r-value in 90° direction with respect to the rolling direction.

4. The ferritic stainless steel sheet according to claim 1, wherein the ferritic stainless steel sheet is used for exhaust system parts.

5. A ferritic stainless steel member for exhaust system parts of an automobile or a motorcycle, comprising a ferritic stainless steel sheet according to claim 1.

6. A method for producing the ferritic stainless steel sheet according to claim 1 comprising executing in sequence:

(a) a process of heating a slab having the chemical composition, and hot-rolling the slab to form a hot-rolled steel sheet under the condition that the finish rolling temperature is 900° C. or lower;

(b) a hot-rolled steel sheet pickling process of pickling the hot-rolled steel sheet without annealing, to obtain a pickled steel sheet;

(c) a cold rolling process of using a rolling mill having a roll diameter of 400 mm or more to subject the pickled steel sheet to cold rolling with a rolling reduction of 60% or more to obtain a cold-rolled steel sheet; and (d) a process of annealing the cold-rolled steel sheet at an annealing temperature Tf (° C.) that satisfies formula (vii) described hereunder;

wherein:

in the process of (d), an average heating rate is:

set to 15° C./s or more in a temperature region from a starting temperature of heating to a starting temperature of recrystallization Ts (° C.) calculated by formula (viii) described hereunder, and set to 10° C./s or less in a temperature region from the starting temperature of recrystallization Ts (° C.) to the annealing temperature Tf (° C.);

$$800 \leq Tf(° C.) \leq 950 \quad \text{(vii)}$$

$$700 \leq Ts(° C.) \leq Tf(° C.) - 100 \quad \text{(viii)}.$$

7. The ferritic stainless steel sheet according to claim 2, wherein the ferritic steel sheet satisfies the formula (v) and formula (vi) described hereunder when a mean r-value is calculated by formula (iv) described hereunder:

$$r_m = (r_0 + 2r_{45} + r_{90})/4 \quad \text{(iv)}$$

$$r_m \geq 1.50 \quad \text{(v)}$$

$$r_{45} \geq 1.30 \quad \text{(vi)}$$

where, each symbol in the above formulas is defined as follows:

$r_0$: r-value in a rolling direction $r_{45}$: r-value in 45° direction with respect to the rolling direction $r_{90}$: r-value in 90° direction with respect to the rolling direction.

8. The ferritic stainless steel sheet according to claim 2, wherein the ferritic stainless steel sheet is used for exhaust system parts.

9. The ferritic stainless steel sheet according to claim 3, wherein the ferritic stainless steel sheet is used for exhaust system parts.

10. The ferritic stainless steel sheet according to claim 7, wherein the ferritic stainless steel sheet is used for exhaust system parts.

11. A ferritic stainless steel member for exhaust system parts of an automobile or a motorcycle, comprising a ferritic stainless steel sheet according to claim 2.

12. A ferritic stainless steel member for exhaust system parts of an automobile or a motorcycle, comprising a ferritic stainless steel sheet according to claim 3.

13. A ferritic stainless steel member for exhaust system parts of an automobile or a motorcycle, comprising a ferritic stainless steel sheet according to claim 7.

14. A method for producing the ferritic stainless steel sheet according to claim 2 comprising executing in sequence:

(a) a process of heating a slab having the chemical composition and hot-rolling the slab to form a hot-rolled steel sheet under the condition that the finish rolling temperature is 900° C. or lower;

(b) a hot-rolled steel sheet pickling process of pickling the hot-rolled steel sheet without annealing, to obtain a pickled steel sheet;

(c) a cold rolling process of using a rolling mill having a roll diameter of 400 mm or more to subject the pickled steel sheet to cold rolling with a rolling reduction of 60% or more to obtain a cold-rolled steel sheet; and (d) a process of annealing the cold-rolled steel sheet at an annealing temperature Tf (° C.) that satisfies formula (vii) described hereunder;

wherein:

in the process of (d), an average heating rate is:

set to 15° C./s or more in a temperature region from a starting temperature of heating to a starting temperature of recrystallization Ts (° C.) calculated by formula (viii) described hereunder, and set to 10° C./s or less in a temperature region from the starting temperature of recrystallization Ts (° C.) to the annealing temperature Tf (° C.);

$$800 \leq Tf(° C.) \leq 950 \tag{vii}$$

$$700 \leq Ts(° C.) \leq Tf(° C.)-100 \tag{viii}.$$

* * * * *